April 11, 1950  J. B. OLSON  2,503,886
POULTRY FEEDER
Filed Aug. 16, 1946
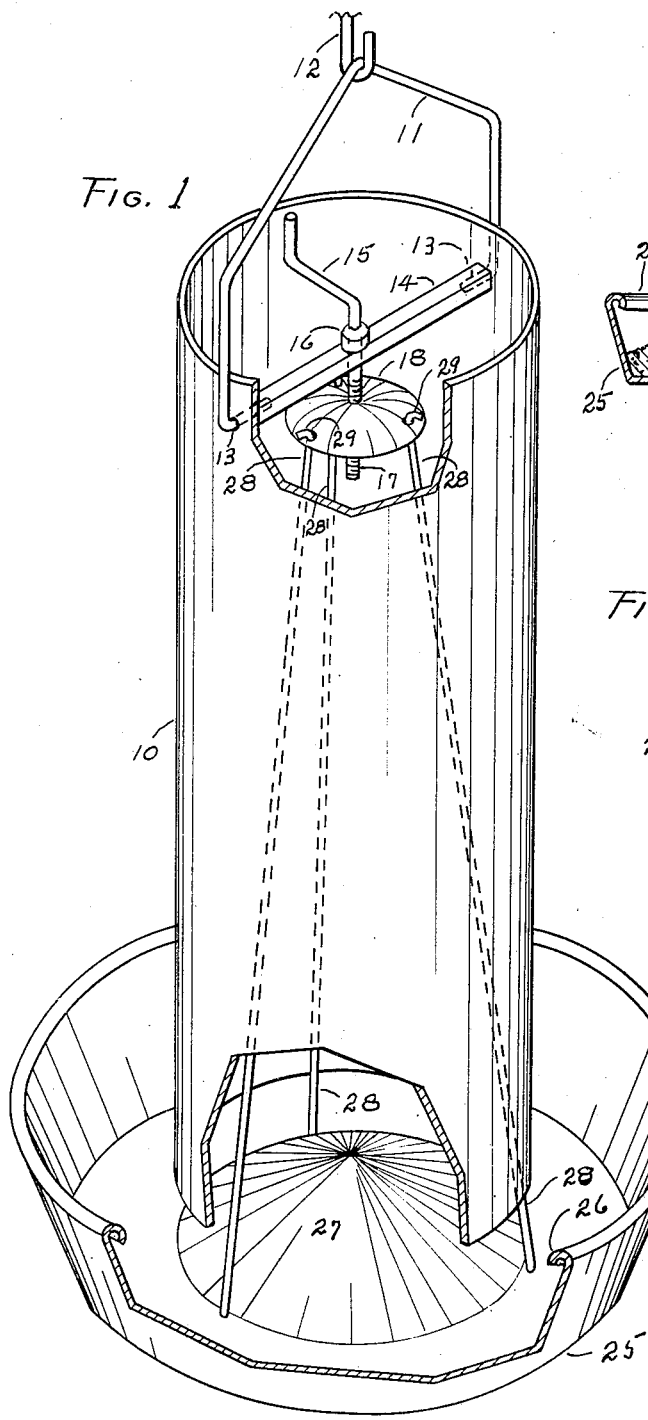
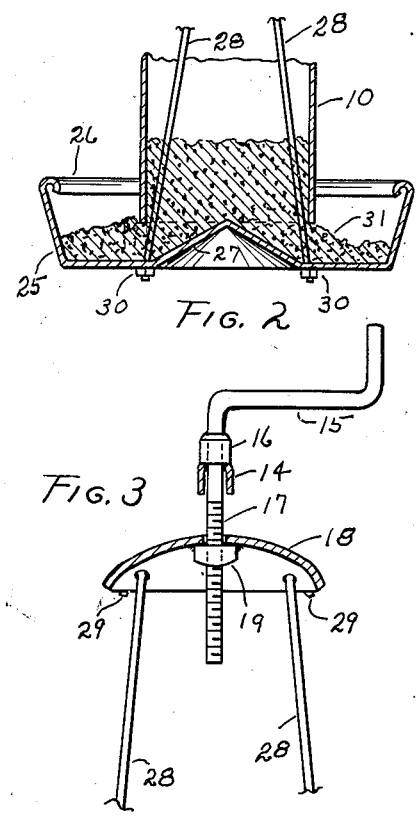
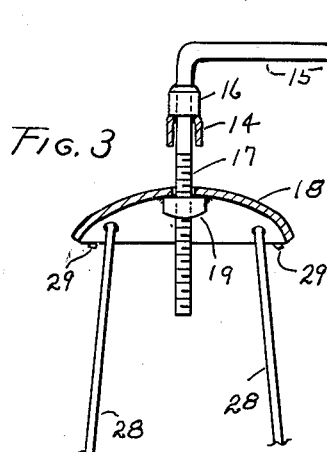
INVENTOR.
JOHN B. OLSON
BY
*A. S. Krotz*
ATTORNEY Patented Apr. 11, 1950

2,503,886

UNITED STATES PATENT OFFICE 2,503,886

POULTRY FEEDER

John B. Olson, Fort Atkinson, Wis., assignor to James Manufacturing Company, Fort Atkinson, Wis.

Application August 16, 1946, Serial No. 691,040

6 Claims. (Cl. 119—53.5)

1

The present invention relates principally to feeders for dry mash for poultry and has for its principal object providing means whereby a considerable quantity of mash or other feed can be placed in the container without danger of becoming clogged.

Other objects of the present invention are to provide a hopper which is simple, easily manufactured at low cost and having room for a large number of birds for feeding at the same time.

Because of the nature of poultry mash, it is inclined to become sticky, packed and lodged in the container and at the point where the mash flows out of the container into the feeding pan. The present invention is adapted to avoid this trouble, thus to make the hopper more efficient and save the time of the attendant.

An object of the present invention is to make possible the use of a circular container preferably of uniform diameter for its length and a circular feeding pan and provide convenient means whereby the feeding pan may be adjusted vertically for determining the out flow of feed into the outer edge of the pan.

An important object of the present invention is the arrangement whereby the hopper is suspended from the ceiling so there is no part of the hopper in contact with the floor and thereby providing means for cleaning the floor and replacing the litter, independent of the hopper.

I accomplish the above enumerated objects by the use of a relatively long circular in cross section container, support the feeding pan in a manner which will constantly stir the mash and prevent it from lodging and feed the mash in the pan uniformly so the birds can all feed simultaneously without interference from the next bird.

To these and other useful ends my invention consists of parts, combination of parts or their equivalents and mode of operation as hereinafter described and claimed and shown in the accompanying drawings in which:

Fig. 1 is a perspective view of my improved hopper, the container being cut away at two points to clearly illustrate some of the details that would otherwise be hidden.

Fig. 2 is a fractional sectional view of the bottom portion of the device, showing the mash.

Fig. 3 is a detailed view partially sectioned illustrating the pan adjusting means.

As thus illustrated 10 designates the container which is preferably circular in cross section, uniform for its length and of a suitable size and length. The container is hung from the ceiling preferably by means of a bale 11 and a hooked rod 12. Bale 11 has inwardly extending ends 13 which extend freely through openings in the container. The ends are long enough to act as a support for a transverse inverted U-shaped bar 14, the bar being full length of the inside diameter of the container.

I provide a crank 15 having a collar 16, the crank extending freely through an opening in the longitudinal center of member 14 and being screw-threaded at its lower end opposite the handle as at 17. I provide preferably an inverted dish-shaped member 18 having a nut 19 secured thereto and an opening in member 18 through which member 17 extends. Member 17 is screw-threaded in member 19 so the attendant can raise and lower member 18 by turning crank 15 for a purpose which will hereinafter appear.

I provide a feeder pan 25 having inturned edges as at 26 and a conically shaped raised central portion 27, the outer edge of which is near the vertical plane of the wall of member 10. I provide three or more supporting rods 28, their upper ends being hooked into member 18 as at 29, their lower ends passing through openings in member 25 adjacent the bottom edge of member 27 and having preferably rigidly secured thereto nuts 30.

Thus as shown and described pan 25 is suspended on collar 16 and is free to swing relative to member 10, the swinging movement being caused by the activity of the birds and will result in preventing clogging or stopping of mash 31 in member 10 and will also prevent pockets directly under the lower edge of member 10. In other words so long as there is mash in the container there will be a solid ring of mash exposed to the birds adjacent the lower end of member 10. Member 15 is used by the operator to determine this flow.

It will be understood that the opening in member 14 will permit free swinging of the pan on collar 16. Furthermore when the pan swings there will be a slight raising or lowering of the part of the pan directly under the lower edge of the container, thus to doubly insure against small pockets forming at any point directly under the container.

Advantages of applicant's device are that the feed can be easily poured into the container, that the feed is protected from exposure to rats and mice and that a relatively large number of birds can feed simultaneously and with the greatest convenience. The usual confusion is avoided because there is always a solid ring of mash directly in front of each bird.

Having thus shown and described my invention I claim:

1. A device of the character described comprising, an elongated substantially circular in cross section container, a bail at the top of the container and means for connecting the bail to a ceiling for supporting the device, a cross member secured in and near the top of said container, a crank having a collar and being threaded below the collar, an opening in the longitudinal center of said cross member through which said threaded portion freely extends, an inverted dish-shaped member having an opening in the center thereof and a nut secured thereto concentric with the opening, the lower end of said crank extending through said opening and nut, whereby the inverted member may be raised and lowered, a feeding pan having a considerably larger diameter than the container and being supported by a number of circumferentially spaced rods which are attached to said inverted dish-shaped member, the lower ends of said rods being secured to the bottom of said pan substantially in alignment with the vertical plane of the lower edge of the container, means whereby the pan is free to swing transversely on said rods and may be adjusted vertically relative to the container by said crank.

2. A device as recited in claim 1 including; the bottom of said pan having an upwardly extending cone shape for substantially the diameter of the container, to thereby urge the feed directly under the container outwardly.

3. A device as recited in claim 1 including, the ends of said bail extending from the outside a distance into said container and adapted to act as a support for said cross member.

4. A device of the character described comprising an elongated substantially round in cross section container, a bail adapted to form means for connecting the upper end of the container to a ceiling for supporting the device, a cross member secured in the container, a crank having a collar, and being threaded below the collar, an opening in the longitudinal center of said cross member through which said threaded portion freely extends, a nut adapted to operatively receive said threaded portion, a feeding pan having a considerably larger diameter than the container, a number of circumferentially spaced downwardly diverging rods operatively attached at their upper ends to said nut, and at their lower ends to said pan, the lower ends of said rods being secured to the bottom of said pan and substantially in alignment with the vertical plane of the lower edge of the container, whereby the pan is free to swing horizontally on said rods, and whereby the pan may be adjusted vertically by said crank relative to the container.

5. A device as recited in claim 4 including, the bottom of said pan having a cone shape for at least the diameter of the container to thereby urge the feed outwardly.

6. A feeding device of the character described comprising, an elongated vertically arranged container having means attached to its upper end for supporting the device, a number of circumferentially spaced downwardly diverging rods having a swinging connection to the upper end of the container with means for adjusting the rods vertically, a feeding pan considerably larger than the bottom of the container and being secured to said rods at the bottom of the pan and substantially in vertical alignment with the lower edge of the container, the lower edge of the container being positioned generally a short distance from the rods and a short distance from the bottom of the pan, whereby the pan may swing horizontally relative to the container and cause the rods to stir the feed in the container and the bottom edge of the container to stir the feed and cause it to move outward.

JOHN B. OLSON.

REFERENCES CITED

The following references are of record in the file of this patent:

UNITED STATES PATENTS

| Number | Name | Date |
|--------|------|------|
| 846,175 | Xevers | Mar. 5, 1907 |
| 905,393 | Webb | Dec. 1, 1908 |
| 1,030,369 | Young | June 25, 1912 |
| 1,058,796 | Schott | Apr. 15, 1913 |
| 1,079,231 | Franklin | Nov. 18, 1913 |
| 1,331,008 | Force | Feb. 17, 1920 |
| 1,350,523 | Royer | Aug. 24, 1920 |
| 1,520,607 | Smith | Dec. 23, 1924 |
| 1,537,337 | De Angulo | May 12, 1925 |
| 1,571,754 | Christopher | Feb. 2, 1926 |
| 1,936,295 | Engelke | Nov. 21, 1933 |